United States Patent [19]

von Horst et al.

[11] Patent Number: 4,490,405
[45] Date of Patent: Dec. 25, 1984

[54] SINGLE STEP EXTRACTION OF BITTER PRINCIPLE AND TANNINS FROM HOPS

[75] Inventors: Louis von Horst, Mainburg; Alfons Hartl, Germering, both of Fed. Rep. of Germany

[73] Assignee: Horst & Klotz Hopfenveredelung GmbH, Mainburg, Fed. Rep. of Germany

[21] Appl. No.: 340,988

[22] Filed: Jan. 20, 1982

[30] Foreign Application Priority Data

Feb. 3, 1981 [DE] Fed. Rep. of Germany ....... 3103617

[51] Int. Cl.³ .............................................. A23L 1/28
[52] U.S. Cl. ................... 426/600; 426/427; 426/429; 426/476; 426/489; 426/494; 203/DIG. 13
[58] Field of Search ............... 426/600, 425, 427, 429, 426/476, 492, 493, 494, 489; 203/90, 96, DIG. 13; 202/236

[56] References Cited

U.S. PATENT DOCUMENTS

| | | | |
|---|---|---|---|
| 2,383,176 | 8/1945 | Willkie | 426/476 |
| 2,618,560 | 11/1952 | Leslie | 426/312 |
| 3,607,298 | 9/1971 | Mitchell et al. | 426/429 |
| 3,891,781 | 6/1975 | Bauer et al. | 426/429 |
| 3,973,052 | 8/1976 | Mitchell | 426/592 |
| 4,049,834 | 9/1977 | Bärwald et al. | 426/600 |

FOREIGN PATENT DOCUMENTS

| | | | |
|---|---|---|---|
| 0753555 | 12/1970 | Belgium | 426/600 |
| 54812 | 4/1890 | Fed. Rep. of Germany . | |
| 395502 | 8/1921 | Fed. Rep. of Germany . | |
| 535841 | 10/1928 | Fed. Rep. of Germany . | |
| 635624 | 1/1934 | Fed. Rep. of Germany . | |
| 737809 | 6/1941 | Fed. Rep. of Germany . | |
| 1442160 | 11/1968 | Fed. Rep. of Germany . | |
| 1927996 | 6/1969 | Fed. Rep. of Germany . | |
| 445465 | 11/1912 | France . | |
| 1301968 | 7/1962 | France . | |
| 837058 | 6/1960 | United Kingdom . | |
| 0994575 | 6/1965 | United Kingdom | 426/425 |
| 1269292 | of 1972 | United Kingdom . | |
| 1444344 | 7/1976 | United Kingdom | 426/600 |

OTHER PUBLICATIONS

Weber, K., "Verfahren und Vorrichting zum Gewinning von Oelsaatenschroten mit Differenziertem Anteil an Wasserloeslichen Proteinen", Fette, Seifen Anstrichmittel, 76, 495–498, (1974).

Primary Examiner—Raymond Jones
Assistant Examiner—Elizabeth C. Weimar
Attorney, Agent, or Firm—Browdy and Neimark

[57] ABSTRACT

A process for extracting bitter principle and tannin from hops, uses ethanol as the extracting agent in a single extraction. By controlling the water content of the ethanol used, the quantity of extracted tannin can be controlled. The tannin component can be separated out of the obtained extract as desired. By treating the extract with water vapor, all the alcohol can be simultaneously expelled and recovered. Ethanol is preferably removed and recovered from the resultant draff by means of the flash desolventizing system (FDS) method.

5 Claims, No Drawings

SINGLE STEP EXTRACTION OF BITTER PRINCIPLE AND TANNINS FROM HOPS

FIELD OF THE INVENTION

The invention relates to a process for extraction of bitter principle and tannins from hops by treating the hops with aqueous ethanol and subsequently recovering the ethanol. The hops are subjected to only a single extraction for removal of both bitter principle and tannin; the extracted tannin component is controlled by means of the water content of the ethanol used as an extraction medium and is removed separately as needed. The invention also relates to the hops extract thus produced as well as to its use in producing hops-extract pellets containing conventional, known carrier media.

BACKGROUND OF THE INVENTION

In recent times, hops have been subjected to extraction predominantly with dichloromethane (methylene chloride) in order to obtain the bitter principle, and the hops thus treated are then treated with hot water in a second extraction step in order to obtain a so-called tannin extract. The two extracts are mixed in a predetermined ratio in accordance with the consumer's wishes. Methylene chloride has the advantage that it has very good solvent properties for the bitter principle in hops, is not combustible, is immiscible in water and can be distilled off at a low temperature.

Hexane and methanol also continue to be used as extracting agents to a certain extent.

For technical and commercial reasons, however, it is difficult to remove the extracting agent from the extract itself in great quantity. For example, a residual solvent content of 2.2% by weight of methylene chloride in the hops extract is officially allowed.

Despite its low toxicity, methylene chloride has quite recently become somewhat suspect as an extracting agent for food and snack items, especially in the case of decaffeinated coffee and soybean oil, so it is not impossible that its use may soon no longer be permitted as an extracting agent in foodstuffs.

All other solvents suitable for hops extraction are relatively highly toxic and suffer from the same difficulties as methylene chloride. For instance, ether and alcohol were long ago recommended for specialized hops extraction processes, without ever becoming widely accepted. According to German Patent No. 54 812, dating from 1890, the lupulone is first separated out from the hops flowers, whereupon the flowers, now substantially free of lupulone, are extracted by boiling in water and the lupulone is extracted with ether or with a 10/90 mixture of ether/alcohol. The two extracts are then condensed and then mixed together. According to German Patent No. 535 841, from 1928, oils and resins are extracted from the hops by passing water and alcohol, partially as steam and partially as condensate, in circles through the hops in a closed system in a vacuum, in a sort of circulation evaporator. This process, and particularly the apparatus required for it, are much too complicated and expensive, however, to have any commercial significance. The first extraction process to attain commercial and technological success was that using methylene chloride, at the beginning of the 1920's. In comparison, yields when hexane or methanol is used as an extracting agent are not very satisfactory.

In the search for new solvents for use in hops extraction, ethyl alcohol was not considered useful for various reasons, although it is present in trace quantities in the human organism as a product of metabolism, and although residual ethanol which may be contained in a hops extract is not objectionable as a product-specific component in beer. The characteristics of ethyl alcohol which were heretofore considered disadvantageous for hops extraction were its combustibility and the associated danger of explosion, for instance, as well as its high boiling point, high heat of vaporization and its miscibility with water. A further disadvantage was seen in the fact that with ethanol, especially aqueous ethanol, substances other than bitter principle and above all polyphenols (tannins) are extracted as well in various quantities, making it difficult to standardize the extract in terms of a certain bitterness content and preventing the production of a pure-resin extract by a single extraction process, as is frequently desired.

This is also confirmed by further prior art. For instance, German Patent No. 635 624 proposes that hops undergo a first extraction with ether or—only in the case of hops low in hops oil—with alcohol, and the remaining draff then undergoes extraction with an alcohol/water mixture, preferably after an intervening extraction using a mixture of ether and alcohol and perhaps water. This process was never put into actual practice, precisely because it was not possible, with alcohol, to obtain a pure bitter-principle extract. Although not specifically indicated in the patent, conventional 96% alcohol must have been used, which must be painstakingly fractionated again and again during the course of the process so as to be able to recover the hops oil as well. For this reason again, this process is not suited to the production of an extract which can be set at a desired standard, because when working with substantially water-free alcohol, there is no balance attained between the extracted and the recovered hops oil.

German Patent No. 737 809 begins with hops extract, with the intention of making a standardizable preparation from it, and this extract is decomposed either with an organic solvent for the hops resins or with water, so as to extract the hops tannin, and the components of the extract, thus separated, can then be mixed together in a desired ratio. Thus it is necessary first to produce a hops extract (for instance, by the old method of German Patent No. 635 624), by a two-step extraction with ether or alcohol, and then to mix the components thus obtained so as to produce a standard preparation. The much older German Patent No. 395 502, referring to the method of German Patent No. 54 812 cited above, discloses the extraction first of the hops substantially freed of lupulone and then of the lupulone itself, first with ether and then in a second step with alcohol; the alcohol extract is then separated into soft resin and hard resin by further extraction with methyl ether, and the residue from the ether extraction and the alcohol extraction is then subjected to a third extraction with water. Thus, as in German Patent No. 54 812, a mechanical removal of the lupulone from the hops is performed, and then a total of four extracts is obtained; when these four extracts are mixed together to attain a standardized preparation, hops oil from other sources must then be added as well.

German laid-open application DE-OS No. 14 42 160 also begins with hops extract, which then undergoes further extraction; the extract used as raw material can be extracted with alcohol at a strength of from 80 to 90% by volume, in order to obtain an extract rich in soft resins from an extract originally obtained with benzene. Again, this is not a process for the extraction of hops but rather a purification process for raw extract, for the purpose of further processing to produce isomerized extracts.

SUMMARY OF THE INVENTION

The basis for the present invention is the surprising discovery that ethanol is excellently well suited as an extracting agent for hops, its supposed disadvantages being eliminated by suitable technological provisions and in part even being advantageously exploitable; further unexpected advantages of the ethanol extract appear as well, in particular improved extraction yields and high attained fermentation values.

It was found that ethanol has an extremely high capacity for permeating the flower clusters of hops, even with a relatively high water content, and it is highly solvent for hops resins; undesired waxes are not extracted at the same time; and by elevating the extraction temperature, for instance to 40° or 60° C., the speed of extraction and the yield as well can be greatly increased.

The fact that aqueous ethanol also extracts tannins, which was previously considered disadvantageous, can be utilized to advantage in that various breweries using extract desire differing proportions of tannin in the extract, depending on local conditions and brewing methods. Since in the extraction of hops with aqueous ethanol according to the invention the tannin component of the extract is dependent on the water content of the ethanol, it is possible to establish a specific tannin content with a single extraction, by varying the ethanol concentration, for example between approximately 70 and 100% by weight; the variation is preferably between about 80 and 95.5% by weight, i.e. 80 to around 96% by weight, and in particular between 85 and 93% by weight (that is, between 89.5 and 95.5% by volume). Thus, the extraction is performed with ethanol containing 4–20%, preferably 7–15% by weight of water. The second extraction of the hops with hot water, which was heretofore necessary and is very labor- and energy-intensive, thus can be eliminated, as can be the concentration of the hot-water extract by vaporization, which requires a great deal of energy. An extraction of hops with 100% ethanol, which produces extracts relatively low in tannin, is possible; however, since hops always contain some water, the alcohol is thereby diluted. Naturally it is also impossible to recover 100% ethanol from ethanol/water mixtures by simple rectification.

In the ethanol extraction according to the invention, it is surprising that in addition to improved extraction yields an additional improvement in fermentation value of the extract is attained, which is greater than that of conventional methylene chloride extracts, which are known to produce greater bitterness values in beer than natural hops. This kind of attained fermentation value, which is expressed in the form of a savings in hops, has its source in the fact that the syrup-like extract released from the lupulone glands enters solution more rapidly during the wort boiling process and is thus more rapidly isomerized. An average value for the savings in hops in the case of methylene chloride extracts is approximately 15%. Both in small-scale brewing at scientific institutions and in breweries, it has been demonstrated that a hops saving of up to 40% is attained using ethanol extracts. Beers of at least equal bitterness were attained with a reduction of 40% in the dose of bitter principle in comparison with natural hops, and in a comparative taste test, the ethanol-extract beers were overwhelmingly preferred.

It is presumed that by means of extraction according to the invention with ethanol containing water, which in practical terms is of course an aqueous, hydrophilic medium, extracts of a more "hydrophilic character" are obtained, which therefore enter solution in an aqueous medium still more easily and quickly. With other solvents, in contrast, hydrophobic substances such as the hops waxes were extracted at the same time, and such substances might exert an inhibiting influence on the dissolving process.

A further advantage attainable in accordance with the invention is that pesticides are not extracted at the same time. In using natural hops, all the cropprotecting agents present on the flower clusters pass directly into the wort; yet this is not the case when ethanol extracts are used. Gas-chromatography tests have shown that ethanol extracts contain neither thiocarbamates nor thioureas, substances which frequently form during boiling from the dithiocarbamates often used as a fungicide. Approximately 90% of these compounds are found to be still contained in the hops draff after extraction.

The removal of the ethanol from the extract obtained can be done in the conventional, known manner; however, the expenditure of energy when concentrating the ethanol extract solution by vaporization, using modern, multi-stage falling-film evaporators, can be reduced quite substantially, to below that required when methylene chloride extract is concentrated by vaporization. The use of these multi-stage evaporators is uneconomical in the instance of methylene chloride, because the temperature difference in the individual stages is too small; yet in accordance with the invention this apparatus produces substantial advantages, such as that the extract is subjected to high temperatures for only a few seconds. A multi-stage evaporator offers the further opportunity of drawing off a high-percentage ethanol condensate from the first stages, so that only a small remnant of the solvent has to be rectified later.

Since some breweries use pure resin extract without any tannin component, the tannin is separated out of the extract obtained in accordance with the invention if an ethanol extract low in tannin is desired. The water-soluble tannin may be washed out, for instance, by treating the extract with hot water; however, in accordance with the invention a treatment of the extract with water vapor in crosscurrent is preferred; this offers the advantage that operation can be continuous, and both the tannin component and the remaining alcohol can be removed virtually completely from the bitter principle.

For removing tannin with hot water, hot ethanol extract having a solids content of 75 to 80% is aspirated into a vessel in a vacuum; a partial vaporization of the alcohol already occurs during the course of this aspiration. After the vacuum is increased, a calculated quantity of hot water is aspirated; intensive mixing occurs during the pronounced boiling action, and the major part of the alcohol is distilled off as ethanol/water vapor, while the remaining hot water dissolves the tannins in the extract. When the extract/water ratio is correctly selected, two phases occur: a virtually tannin-free bitter principle phase and an aqueous phase containing almost all the water-soluble components as well as part of the alcohol. The two phases can be drawn off and processed separately. Remaining amounts of the alcohol in the water-containing bitter principle can be removed easily with a thin-film evaporator.

In order to remove tannin with water vapor, hot ethanol extract containing approximately 75 to 80% solids is pumped to a packed column or bubble-tray column. Water vapor is blown through the apparatus in a cross-current from bottom to top. The vapor current can be set such that on the one hand all the alcohol can be distilled off at the top from the extract passing as a thin film over the packed column, as in a rectification column, while on the other hand the condensed vapor component mixes with the extract, and the water-soluble components are dissolved out. The discharge comprising bitter principle and aqueous tannin solution is separated and processed. As already noted, a continuous throughput and a virtually complete removal of the ethanol are thereby attained.

The method according to the invention thus offers the opportunity of obtaining tannin and bitter principle in a single extraction step with a suitable alcohol-water mixture by adjusting the suitable water content, preferably by using alcohol at a strength of 85 to 93% by weight and in particular 90% by weight, and then to separate the tannins and bitter principle in a simple manner in one step, for instance in a washing column of the bubble-tray column type, because when the method is suitably performed two phases occur, an upper bitter-principle phase and a lower tannin phase, and these can then be separated easily. By blowing vapor into the column, all the alcohol is simultaneously stripped off and recovered from the extract. A critical factor in this kind of process is that the aqueous phase should attain a specific gravity of about 1.2; in other words, too much or too little water vapor cannot be allowed to condense. The required quantity of water, which in turn is dependent on the tannin component, can be controlled by means of the remnant alcohol content of the raw extract, since when the alcohol is vaporized an equivalent quantity of water vapor condenses.

Even after extraction, the hops draff treated with extracting agents still contains about 70% solvent. For environmental and economic reasons, but also because of regulations on alcohol tax, the alcohol is removed from this draff. Although it is quite complicated to do so, the removal can be accomplished by evaporation; in that case, however, very great amounts of diluted alcohol solution are produced, which must then be rectified.

To this end, it is preferred in accordance with the invention that the so-called FDS method be used (flash dissolving system method), which has heretofore not been used in processing hops; it is described, by way of example, in the journal, Fette-Seifen-Anstrichmittel [Fats, Soaps, and Paints] 76 (1974), p. 497. According to this method, the product to be dried is swirled with a superheated gas flow, the superheat of the transporting medium causing the solvent in the product to evaporate. According to the present invention, the damp draff is introduced via a gas-tight lock into a system of tubes, is swirled with superheated alcohol vapor at a temperature of 100° to 130° C. for example, and 100° to 120° C. in particular, and is transported pneumatically. Once the liquid solvent has been vaporized after a contact time of a few seconds, the draff, now practically free of solvent, is discharged via a cyclone. A quantity of gas equal to the quantity of vaporized solvent and capable of being used as heating vapor is drawn off from the system via an automatic regulating valve. The remaining gas is returned via a superheater to the draff inlet site. The virtually dry draff can be formed into pellets and thus used as livestock feed, which is not possible in the case of wet draff.

DETAILED DESCRIPTION OF PREFERRED EMBODIMENTS

The following examples are intended to explain the invention in greater detail. If not otherwise specified, "%" always means "% by weight".

EXAMPLE 1

(Soxhlet Extraction)

100 g of hops were subjected at a time to extraction in a Soxhlet apparatus for 6 hours; the product was vaporized in vacuo and analyzed. The results obtained are listed in Table I; the alpha acids were determined as a conductometric value.

TABLE I

| Solvent | Quantity of Extract (g) | Separated Resin (%) | Alpha Acids (KW) (g) |
|---|---|---|---|
| Methylene chloride | 21.5 | 95.95 | 11.1 |
| Ethanol, 90% by wt. | 41.0 | 58.35 | 11.4 |

The results show that under identical extraction conditions, not only is more extract obtained using ethanol at a strength of 90% by weight, but also somewhat more alpha acids are extracted from the hops than when methylene chloride is used.

EXAMPLE 2

(Omni Mixer Extraction)

30 g of hops at a time were placed in four Sorvail beakers, mixed with 300 ml of solvent in each beaker and macerated for 10 minutes. Hexane, methylene chloride and ethanol at a concentration of 90 to 95% by volume were used as solvents. The mixtures were filtered and each 30 ml of filtrate was vaporized and analyzed.

The results showed that under identical extraction conditions, more alpha acids were obtained in the extract when ethanol was used than when hexane and methylene chloride were used.

The non-bitter-principle component (called the "tannin content") was 0% using hexane and 4.6% using methylene chloride, while with ethanol at 90% by volume (equal to 85.5% by weight) this figure was 30%, and with ethanol at 95% by volume (equal to 92.5% by weight) this figure was ca. 25%, computed as a dry substance.

EXAMPLE 3

(The Effects of Temperature)

50 g of hops at a time were mixed in a flask with 600 ml of solvent, either methylene chloride or ethanol at a strength of 90 to 95% by volume (86 to 92% by weight), at different temperatures; extraction was performed with moderate stirring for 20 minutes, the temperature being maintained for that period. The product of extraction was filtered off and subjected to extraction twice more with 400 ml each of solvent for 20 minutes. The solvent extract was aspirated off, and the residue was then washed with 100 ml of solvent. The extracts were vaporized and analyzed.

It was found that with increasing temperatures, the yields of both extract and alpha acids increase as well.

EXAMPLE 4

(Crosscurrent or Countercurrent Extraction)

700 g each of Hallertauer Aromahopfen (Haro) hops or of Hallertauer Nordbrauer (HNB) hops containing 5.6% and 9.3% of alpha acids, respectively, having been comminuted to an average particle size of 4 to 4.5 mm, were introduced into a column of a diameter of 100 mm and subjected to extraction by circulation pumping with ca. 3 to 5 kg of solvent per kg of hops, at 20° C. or 40° to 50° C. respectively. The solvent was ethanol at a strength of 80 to 90% by weight, and hexane was used in a comparison test. After 20 minutes each, the solvent extract was discharged and new solvent added. In all, extraction was performed six to eight times.

In an experiment performed using ethanol at a strength of 90% by weight at 40° to 50° C., countercurrent extraction was performed; that is, the extraction solutions obtained were used for performing extraction from fresh hops; the miscella having the highest concentration of extract was used first for the new series of extractions.

In this series of experiments, conditions virtually identical to those existing in practice were adhered to; in particular, the quantity of solvent was kept as small as possible.

It was found that even at a low flushing ratio (kg of solvent : kg of hops), which varied between about 3 and 4.6, good extraction yields can be attained with ethanol in crosscurrent or countercurrent extraction. This was confirmed by the draff analysis as well, which showed that the content of total resin with ethanol was 0.2 to 0.7% and with hexane was 4.3%. The test extraction performed with hexane, under identical conditions, produced a completely unsatisfactory extraction yield.

EXAMPLE 5

(Tannin Separation with Water Vapor)

Heated raw extract having an average remaining solvent content of 17% was continuously fed into a glass column filled with Raschig rings and with a diameter of 80 mm and a height of 1000 mm; the raw extract ran in a thin layer over the packing bodies. From the bottom, water vapor at a pressure of from 0.3 to 0.6 bar was blown into the column in a countercurrent. A portion of the water vapor condensed and mixed intensively with the extract. This return-flow ratio can be controlled by means of the quantity of vapor introduced, insulation of the column wall to a greater or lesser extent or the temperature of the raw extract introduced. The ratio in this instance was selected such that the density of the aqueous tannin phase was markedly above that of the bitter-principle phase. A portion of the water vapor was drawn off at the top together with the vaporized alcohol and condensed in a run-down tank. The mixture of extract and water discharged at the bottom was separated by gravity (by centrifuging), and the two phases were then processed.

In the system used, the quantity of vapor could not be measured exactly. In a typical experiment, this quantity was averaged by weighing all the components of the increase in weight, producing the following results:

| | |
|---|---|
| raw extract | 3700 g |
| extract discharge | 4320 g made up of bitter principle phase, 2200 g and tannin phase, 2120 g |
| condensate | 260 g |
| weight increase | 880 g |

The weight increase of 880 g thus calculated is dictated by the quantity of vapor blown in and was presumed to be vapor consumption. The other results are given in Table II.

The results show that by optimizing the quantity of vapor and the return-flow ratio, bitter-principle extracts which are virtually tannin- and alcohol-free are obtained.

This example was repeated using a raw extract with a solid content of 75% by weight (that is, a residual solvent content of 25%); the final residual alcohol content was below 0.5% (specifically, 0.2%) and the separation of tannin and bitter principle was in fact improved. In a large-scale system, bitter principle is obtained having a residual alcohol content below 0.1% and sometimes below 0.01%.

TABLE II

| Test | Sample or phase | Solids, % | Tannin Content, % dry matter | Separated Resin, % dry matter | Alpha Acid (KW) % dry matter | Ethanol, % by wt. |
|---|---|---|---|---|---|---|
| — | Raw Extract | 82.2 | 28.8 | 71.2 | 32.6 | 16.2 |
| A | Bitter Principle | 89.5 | 4.1 | 95.9 | 39.1 | 3.4 |
|   | Tannin |  | 17.7 | 1.1 | 0.25 | 4.1 |
| B | Bitter Principle | 93.7 | 2.4 | 97.6 | 39.8 | 1.0 |
|   | Tannin |  | 57.0 | 1.0 | 0.05 | 1.0 |
| C | Bitter Principle | 88.1 | 0.7 | 99.3 | 43.2 | 1.0 |
|   | Tannin |  | 39.8 | 1.0 | 0.1 | 0.9 |

EXAMPLE 6

(Process Carried Out at One-Half Industrial Scale)

457 kg of HNB hops containing 7.3% of alpha acids were subjected to extraction in an extraction apparatus by the countercurrent method, with an alcohol/water ratio of 90/10 in per cent by weight. Approximately 2200 l of miscella were obtained, which were continuously concentrated by vaporizing in a three-stage falling-film evaporator and a following two-stage high-grade concentrator. The concentrate thus obtained has a solid content of 82.8% and a residual alcohol content of 9%.

The extract was continuously pumped at a temperature of ca. 60° C. and with an output of 40 kg/h to a perforated-bottom column, into which water vapor was blown at the lower end. The extract/water mixture discharged at the bottom was separated into two phases in a subsequent separator apparatus.

In a modification of the process, the extract/water mixture was pumped in at the middle of a high column, and the two phases then separated by their own weight and could be drawn off at the top and bottom, respectively. In this instance, a specific gravity of approximately 1.2 is required for the aqueous phase. The extract obtained and the two phases obtained had the composition indicated in Table III.

TABLE III

| Sample or Phase | Solids, % | Tannin, % dry matter | Separated Resin, % | Separated Resin, % dry matter | Alpha % | Acids % dry matter | Ethanol % by wt. |
| --- | --- | --- | --- | --- | --- | --- | --- |
| Raw Extract | 82.8 | 30.9 | 57.2 | 69.1 | 24.1 | 29.1 | 9.0 |
| Bitter Principle Phase | 95.3 | 3.7 | 91.1 | 95.6 | 37.7 | 39.6 | 0.7 |
| Tannin Phase | 37.3 | 42 | 1.0 | — | 0.2 | | 0.5 |

The results of this experiment, carried out at one-half industrial scale, confirmed the expectations arising from the experimental research.

EXAMPLE 7

(Brewing Experiments)

Test mashes were prepared with hops of the Hallertauer Nordbrauer (HNB) type and of the Hallertauer Mittelfrüh (HMF) type and also with the ethanol extracts produced from these hops. The tannin was separated out of the HNB extract for mash A, while complete ethanol extracts were used for mashes B and C. The hops and the extracts made from them had the following composition:

TABLE IV

| Hops or Extract | $H_2O$, % | Separated Resin, % | Alpha Acids, % | Polyphenols and Anthocyanogens, % |
| --- | --- | --- | --- | --- |
| HNB A | 11.8 | 17.7 | 7.1 | 7.09 |
| Extract A | | 55.0 | 21.6 | 0.78 |
| HNB B | 9.7 | 18.1 | 8.9 | 4.62 |
| Extract B | 1.0 | 62.8 | 27.5 | 2.68 |
| HMF C | 12.9 | 12.2 | 4.7 | 5.87 |
| Extract C | 2.9 | 42.5 | 15.6 | 7.88 |

In test mash A, the same bitter-principle quantity (65 mg of alpha acids per liter of wort) was used with natural hops and with extract. In mashes B and C, a greater quantity of alpha acids by a factor of 1.4 in comparison with the extracts was used with the natural hops. The bitter principle was added in one dose to the boiling wort. The beers were brewed and stored normally. The results of analysis of the beers are given in Table V.

TABLE V

| | Mash A | | Mash B | | Mash C | |
| --- | --- | --- | --- | --- | --- | --- |
| | HNB A | Extract A | HNB B | Extract B | HMF C | Extract C |
| EBC Bitterness Unit (BE) | 21.6 | 28.1 | 29.8 | 27.7 | 24.2 | 27.8 |
| Alpha Acids, mg/l | 2.1 | 0.8 | 2.5 | 1.7 | 2.8 | 2.0 |
| Iso-Alpha Acids, mg/l | 21.3 | 29.9 | 30.5 | 27.4 | 23.7 | 27.4 |
| Polyphenols & Anthocyanogens, mg/l | 221 | 214 | 238 | 199 | 274 | 216 |

In mash A, with the same dose of bitter principle, the extract beer had bitterness values ca. 40% higher than those of beers made from natural hops. For that reason, 1.4 times the quantity of natural hops was added to mashes B and C. Nevertheless, the bitterness values for extract beer B were only ca. 10% below those of the comparison beer, and in extract beer C these values were significantly higher.

The assessment was as follows: In appearance, aroma and consistency, the ethanol extracts do not differ from the commercially conventional methylene chloride extracts. The typical resin composition specific to certain types of bitter hops and aromatic hops remained the same.

The yield of iso-alpha acids in wort boiling was greater than expected, based on experience with methylene chloride extract.

No negative influence was found on the degree of fermentation, color, head, nitrogen ratios or taste and bitterness.

The hops extract obtained can be processed further in a manner known per se to make hops-extract pellets or hops-extract powder, for example by means of intimate mixing with ground hops, ground hops draff and/or mineral substances having a large surface area, in particular those based on silicon dioxide or silicate; in particular, silicic acid of the Aerosil type or silicic acids obtained by precipitation are used, as is known from German laid-open application DE-OS No. 19 27 996, for example. In this manner, the extract can be transported in the form of free-flowing powder or free-flowing and easily dispensable pellets. In the case of pellets, the most important methods are the incrustation of the extract with ground hops draff or ground hops, or the intimate mixing thereof, and subsequent formation into pellets. These procedures are well known in this field and it is merely noted that the extract produced in accordance with the present invention can be processed further in the same manner as can the known extracts.

We claim:

1. In a process for obtaining bitter principle and tannins from hops comprising extracting the hops with aqueous ethanol and subsequently removing the tannin component and recovering the ethanol from said extract, the improvement wherein the tannin component and the ethanol are simultaneously removed from the obtained ethanol extract by continuously pumping the ethanol extract having a solids content of about 75 to 80 percent by weight into a perforated bottom-type column and blowing water vapor countercurrently in a upward direction, or aspirating said extract into an evacuated column and feeding hot water therein, while controlling the amount of water added, thereby forming a two phase product in the form of an upper bitter principle phase and a lower aqueous tannin phase having a specific gravity of about 1.2, and the phases are separated to obtain bitter principle and tannin.

2. A process according to claim 1, wherein the tannin content of the two phase product is controlled by varying the ethanol concentration.

3. A process for extracting bitter principle and tannins from hops by a single treatment of the hops with aqueous ethanol and subsequent recovery of the ethanol, which process comprises extracting the hops with ethanol containing about 4 to 20% by weight of water;

removing the ethanol from the obtained ethanol extract having a solid content of about 75% to 80% by weight, and simultaneously forming a two phase product, by continuously pumping said extract to a perforated-bottom column and blowing water vapor countercurrently in an upward direction, or by pumping said extract into an evacuated column and aspirating hot water therein, while controlling the amount of water added, thereby forming said two phase liquid in the form of an upper bitter principle phase and a lower aqueous tannin phase having a specific gravity of about 1.2; and separating said two phases.

4. A process as defined by claim 3 wherein said extraction is performed using ethanol with a water content of 7 to 15% by weight.

5. A process as defined by claim 3, wherein said ethanol is removed and recovered from the resultant draff with the aid of the flash desolventizing system (FDS) method.

* * * * *